Oct. 13, 1970   E. H. TOTT   3,533,177
INFORMATION SHEET HOLDER
Filed March 18, 1968
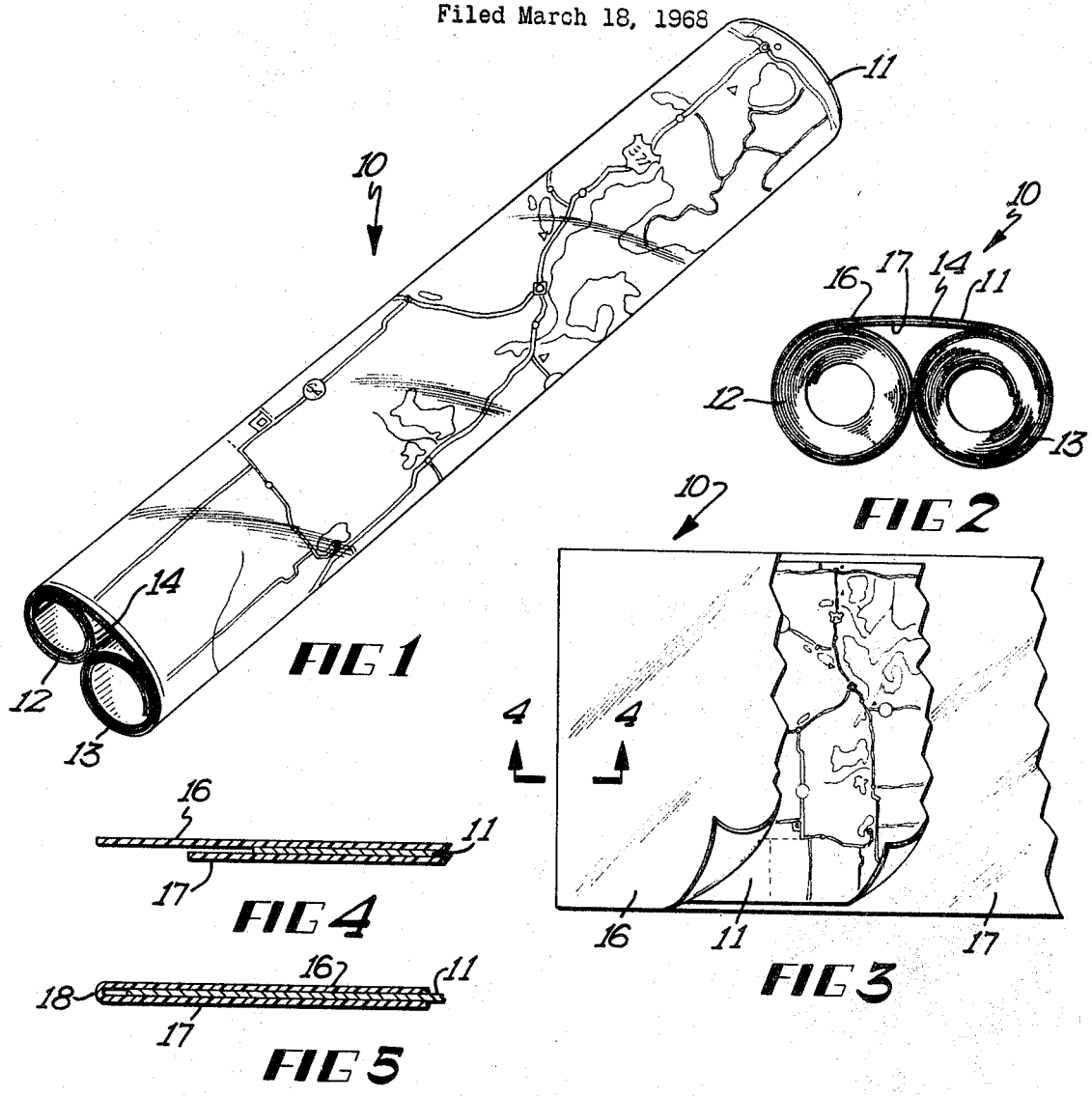
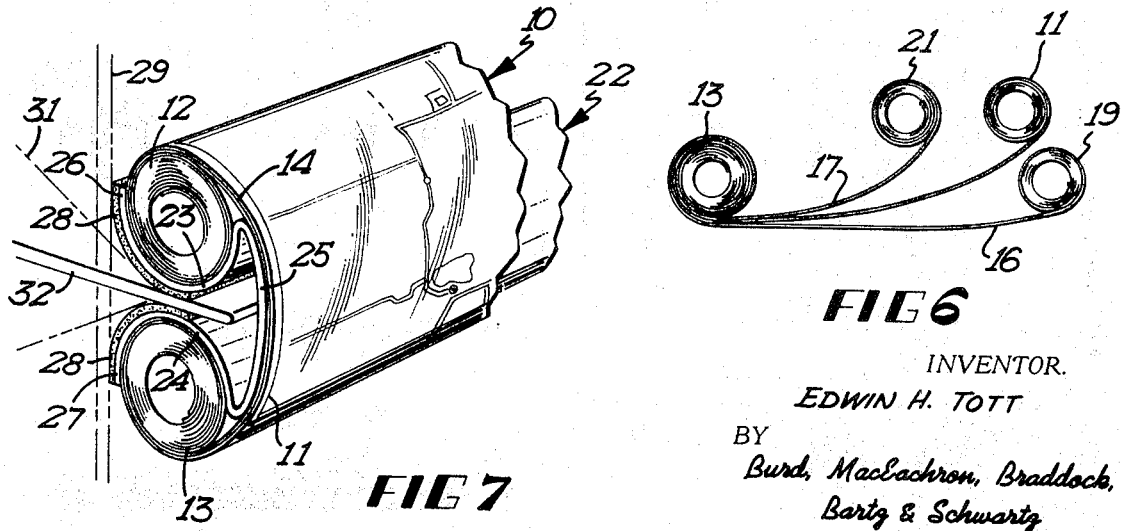
INVENTOR.
EDWIN H. TOTT
BY
Burd, MacEachron, Braddock,
Bartz & Schwartz
ATTORNEYS

United States Patent Office 3,533,177
Patented Oct. 13, 1970

3,533,177
INFORMATION SHEET HOLDER
Edwin H. Tott, Minneapolis, Minn., assignor of fifty percent to Emil Dragon, Mason City, Iowa
Filed Mar. 18, 1968, Ser. No. 713,847
Int. Cl. G09f 3/18
U.S. Cl. 40—10                                         12 Claims

ABSTRACT OF THE DISCLOSURE

A holder for displaying and protecting a sheet member carrying a map. The map is sandwiched between two sheets of flexible transparent plastic material having self-curling or rolling memory from opposite sides and rigid linearly in directions normal to the opposite sides. The sheets of transparent plastic material are rolled together from their opposite sides locating the map between the sheets. A portion of the map is exposed between the rolled sides. The holder is mounted on a support having longitudinal side recesses accommodating the side rolls of the holder.

BACKGROUND OF INVENTION

The invention broadly relates to the combination of an information carrying sheet with a sheet of transparent, flexible, self-curling material. Map holding devices having a cylindrical transparent container for accommodating a map, as shown in the U.S. patent to Erickson No. 2,211, 599, permit the map to be read on rotating the map relative to the cylindrical container. Strip and road map holders for carrying opposite rolled ends of a map have been developed for use in conjunction with the sun visor of an automobile. This type of a holder is shown in the U.S. patent to Baker No. 2,821,798. The conventional portable map case shown in the U.S. patent to Hopkins No. 2,293, 989, utilizes flexible sheet material with the map located under a transparent sheet. The map holder of the invention utilizes the physical characteristics of the plastic sheet material to protect the map and expose desired portions of the map for convenient viewing. The holder can accommodate various forms of information sheets, as road maps, blueprints, fishing maps, navigation charts and the like.

SUMMARY OF INVENTION

The invention relates to a holder for a flexible information carrying sheet. In one embodiment of the invention, the holder has a sheet of transparent flexible material located adjacent a second sheet of flexible material. The information carrying sheet is sandwiched between the first and second sheets with the first and second sheets being of a size to cover at least a part of the information carrying sheet. At least one of the first or second sheets has the characteristic of being self-curling from opposite sides and linearly rigid in the direction generally normal to the opposite sides. The first and second sheets are rolled together from their opposite sides to locate the information carrying sheet between the first and second sheets. A portion of the information between the rolled sides is exposed for viewing. The map holder can be held on a support having longitudinal side recesses for accommodating the rolled sides of the first and second sheets.

In the drawing:
FIG. 1 is a perspective view of the holder carrying a road map;
FIG. 2 is an enlarged end view of the holder of FIG. 1;
FIG. 3 is a plan view of the holder of FIG. 1 unrolled into a generally flat position with the covering sheets broken away to illustrate the map sandwiched between the sheets;

FIG. 4 is an enlarged sectional view taken along the line 4—4 of FIG. 3;
FIG. 5 is a view similar to FIG. 4 showing the covering sheets joined together along one of the curling edges;
FIG. 6 is a diagrammatic view illustrating the rolling of the map between the covering sheets; and
FIG. 7 is a fragmentary perspective view of a holder mounted on a support used to mount the holder on an object.

Referring to the drawings there is shown in FIG. 1, the holder of the invention indicated generally at 10 carrying a road map 11. The road map 11, illustrated as a particular information carrying sheet, is not intended to limit the utility of the invention. The holder is adapted to accommodate blueprints, fishing maps, navigation sheets, and any flexible material used to carry visually interpretive information.

The holder 10 has two longitudinal side rolls 12 and 13 joined with a web 14. In use, the side rolls 12 and 13 rotate in the same direction so that the web 14 is turned onto one roll and is taken off of an opposite roll so connecting portions of the map may be viewed as desired.

Referring to FIG. 3, there is shown the holder 10 extended in a flat position with the covering sheets 16 and 17 broken away to illustrate the map 11 sandwiched between the covering sheets 16 and 17. The covering sheets 16 and 17 are formed from transparent flexible plastic material and are of a size to cover the entire map. The map may extend beyond the top and bottom edges of the cover sheets so that only a portion of the map is located between the covering sheets 16 and 17. The flexible plastic covering sheets are self-curling from the opposite sides and have the characteristic of curling or roll memory so that the sheets will retain the curled side rolls 12 and 13 over a range of temperature from 180° F. to minus 50° F. The cover sheets 16 and 17 can range in thickness from four to six mils. The thickness of the plastic material varies with the desired degree of flexibility and with the different plastic materials used. The plastic materials have the general characteristic of being tough, transparent and tear resistant and have plastic memory and sufficient flexibility to provide relatively easy rolling of the side rolls 12 and 13 to expose different portions of the web 14. Examples of plastic materials usable to form the covering sheets are: Mylar, cellulous-acetate, cellulous-triacetate, cellulous propionate, ethyl cellulous, calendared rigid vinyl cross-linked polyethylene, orientated polypropylene and like plastic materials.

An example of a particular plastic material used in the formation of the flexible covering sheets 16 and 17 is four mil Mylar initially rolled in a cylindrical shape and retained in the cylindrical shape while being subjected to heat between 200 and 350 degrees F. for about ten minutes to set the plastic in a curled shape. The plastic is cooled in the curled or cylindrical shape providing both opposite sides of the Mylar sheets with curling memory. The map 11 is inserted between the plastic sheets by initially placing the map on top of both sheets and rolling the map up into the sheets. The top sheet is then rolled back placing the map between the sheets. As shown in FIG. 4, one side of sheet 16 extends beyond the adjacent side of the sheet 17 so that one of the sheets can be curled independent of the other to place the map between the sheets.

As shown in FIG. 5, the cover sheets 16 and 17 are secured together at one side 18. FIG. 6 shows the procedure of inserting the map 11 between the sheets 16 and 17. The map 11 is placed between the sheets by initially placing one side of the map between the sheets adjacent the joined side 18. The closed side 18 functions as a stop to transversely position the map between the covering sheets. By rolling one side 13 and allowing the curled ends 19 and 21 to separately unroll the entire map 11 is placed between the sheets 16 and 17. In use, the sides of the covering sheets are rolled together into two separate side rolls 12 and 13 connected with a web 14. The width of web 14 can be changed by moving the side rolls apart thereby making a large portion of the map viewable.

The holder 10 is usable with a support indicated generally at 22 in FIG. 7. Support 22 has convex curved side members 23 and 24 joined with a convex curved top 25. The side members have longitudinal semi-circular side recesses. The lower ends of the side members 23 and 24 terminate in outwardly directed flat flanges or flat feet 26 and 27 to provide flat surface areas for securing the support to an object. The support 22 is made of rigid flexible material providing clamp-like action of the side members. Attached to the outer surfaces of the flanges 26 and 27 and facing surfaces of side members 23 and 24 is an adhesive material 28 used to attach the support 22 to an object as a flat surface 29, a corner 31, a flat member 32, as a sun visor of an automobile or any curved or rounded surface. The adhesive material 28 extends the entire length of the support. The holder 10 is retained on the support 22 by the biasing action of the curled side rolls 12 and 13 which tend to hold the rolls in abutting relationship as shown in FIG. 1. The curling characteristics of the covering sheets provide a clamp action which releasably holds the holder on the support 22. The type and design of the support may vary to utilize the clamping action of the holder.

While there have been shown and described a particular embodiment of the holder with the use of a road map, it is to be understood that changes in the material, shape and other additions and omissions may be made by those skilled in the art without departing from the spirit of the invention. For example, a single covering sheet may be utilized to protect the outside facing of the map. Also, the flexible covering sheet may be laminated or otherwise secured to the map providing a one sheet map and holder having self-curled opposite sides. The invention is defined in the following claims.

The embodiments of the invention in which an exclusive property or privilege is claimed are defined as follows.

1. A holder for an information carrying sheet comprising: a first sheet of flexible transparent plastic material, and a second sheet of flexible plastic material located over said first sheet, said first sheet and said second sheet being secured together along one side thereof, said first sheet and second sheet being located on opposite sides of an information carrying sheet and being of a size to cover at least a part of the information carrying sheet, said information sheet having an edge located adjacent the secured side of the sheets, said first sheet and second sheet having self-curling permanent memory from opposite sides along axes parallel to the secured side of the sheets whereby the sheets automatically roll together from the opposite sides to locate the information carrying sheet between the first and second sheets and expose a portion of the information between the rolled sides of the first and second sheets.

2. The holder of claim 1 wherein the second sheet is transparent plastic sheet material.

3. The holder of claim 1 wherein the first and second sheets are of a size to cover all of the information carrying sheets.

4. The holder of claim 1 in combination with a support having longitudinal side recesses for accommodating the rolled sides of the first and second sheets.

5. The holder of claim 4 including means for securing the support to an object.

6. The holder of claim 4 wherein the support has at least one foot and adhesive material on the outside surface of the foot.

7. The holder of claim 6 wherein the support has facing convex curved members, a pair of outwardly directed flat feet and adhesive material on the outside surfaces of said feet.

8. The holder of claim 1 wherein said information carrying sheet is a map.

9. A holder for an information carrying sheet comprising: a first sheet of transparent flexible plastic material, a second sheet of flexible plastic material located over said first sheet, said first sheet positioned over one side of an information carrying sheet, said second sheet located over the other side of the information carrying sheet, said first sheet and said second sheet both of a size to cover at least a part of the information carrying sheet, said first sheet and second sheet having self-curling permanent memory from opposite sides whereby the sheets and information carrying sheet sandwiched between the first and second sheets automatically roll together from opposite sides to expose a portion of the information sheet between the rolled sides of the first and second sheets.

10. The holder of claim 11 wherein the first and second sheets are of a size to cover all of the information carrying sheet.

11. The holder of claim 9 wherein the first sheet and the second sheet are integrally joined together along one edge of the holder.

12. The holder of claim 9 wherein the first sheet and the second sheet are made from flexible sheet plastic material having plastic memory.

References Cited

UNITED STATES PATENTS

| | | | |
|---|---|---|---|
| 2,173,188 | 9/1939 | Van Dersal | 40—86 |
| 2,563,580 | 8/1951 | Clark | 40—86 |
| 3,426,461 | 2/1969 | Miller | 40—31 |
| 2,422,547 | 1/1969 | Heine | 40—86 X |

JEROME SCHNALL, Primary Examiner

W. J. CONTRERAS, Assistant Examiner

PO-1050
(5/69)

UNITED STATES PATENT OFFICE
CERTIFICATE OF CORRECTION

Patent No. 3,533,177    Dated October 13, 1970

Inventor(s) Edwin H. Tott

It is certified that error appears in the above-identified patent and that said Letters Patent are hereby corrected as shown below:

Column 4, line 38, "claim 11" should be --claim 9--.

SIGNED AND
SEALED
DEC 8 1970

(SEAL)
Attest:

Edward M. Fletcher, Jr.
Attesting Officer

WILLIAM E. SCHUYLER, JR.
Commissioner of Patents